United States Patent [19]

Fujimura

[11] Patent Number: 5,432,227

[45] Date of Patent: Jul. 11, 1995

[54] PHENOLIC RESIN MOLDING MATERIAL

[75] Inventor: Norihisa Fujimura, Fujieda, Japan

[73] Assignee: Sumitomo Bakelite Company Limited, Tokyo, Japan

[21] Appl. No.: 17,482

[22] Filed: Feb. 12, 1993

[30] Foreign Application Priority Data

| Sep. 9, 1992 [JP] | Japan | 4-241028 |
| Sep. 9, 1992 [JP] | Japan | 4-241029 |
| Oct. 14, 1992 [JP] | Japan | 4-275584 |

[51] Int. Cl.$^6$ ............................................. C08L 61/06
[52] U.S. Cl. .................................. 524/508; 524/14; 524/425; 524/445; 524/451; 524/494; 524/593; 523/222
[58] Field of Search ............... 524/14, 425, 445, 451, 524/494, 593, 508; 523/222

[56] References Cited

U.S. PATENT DOCUMENTS

| 2,761,176 | 9/1956 | Welch et al. | 264/77 |
| 3,082,179 | 3/1963 | Miller et al. | 523/171 |
| 3,597,498 | 8/1971 | Christensen | 525/179 |
| 4,107,135 | 8/1978 | Duggins | 523/457 |
| 4,115,509 | 9/1978 | Kendall-Smith et al. | 264/331.11 |
| 4,118,365 | 10/1978 | James et al. | 524/877 |
| 4,433,070 | 2/1984 | Ross et al. | 523/171 |
| 4,544,584 | 10/1985 | Ross et al. | 428/15 |
| 5,032,642 | 7/1991 | Lemon et al. | 524/596 |
| 5,162,428 | 11/1992 | Katoh et al. | 524/594 |

FOREIGN PATENT DOCUMENTS 59105049 5/1982 Japan.
57078444 6/1984 Japan.

Primary Examiner—Paul R. Michl
Assistant Examiner—John Guarriello
Attorney, Agent, or Firm—Browdy and Neimark

[57] ABSTRACT

A phenolic resin molding material comprising a phenolic resin, an organic filler, an inorganic filler and a liquid substance having a boiling point of 80°–150° C., said phenolic resin comprising, as its main component, a novolac type phenolic resin wherein the ratio of the o-methylene bond to the p-methylene bond with respect to the phenol nucleus ranges from 1.0 to 2.5.

20 Claims, No Drawings

PHENOLIC RESIN MOLDING MATERIAL

The present invention relates to a phenolic resin molding material which has good thermal stability, which is easy to fill into a molding die, which has excellent rapid curability, and which is capable of giving a molded article having reduced abrasiveness against tools, e.g. drilling operation, etc. as well as improved mechanical strength.

Many of the general phenolic resin molding materials comprise a novolac type phenolic resin as a main component and hexamethylenetetramine (hexamine) as a curing agent, and are cured by the reaction of these two components. Such phenolic resin molding materials using a novolac type phenolic resin have relatively good curability in injection molding, but are insufficient in thermal stability in an injection cylinder during said molding and are also insufficient in their capability of being suitably injected into a molding die; hence, improvement in continuous moldability has been required for said phenolic resin molding materials.

With respect to the curability of said phenolic resin molding materials, it has been studied to improve the curability by using a high-ortho-novolac type phenolic resin wherein the proportion of the o-methylene bond with respect to the phenol nucleus is high, and phenolic resin molding materials using such a high-ortho-novolac type phenolic resin are in practical use. However, they are insufficient in thermal stability, etc. in injection moldability, and further improvement has been desired.

With respect to the filler used in the phenolic resin molding materials using a novolac type phenolic resin, there is used, as an organic filler, mainly wood flour. As the organic filler, there are also used, depending upon applications of the phenolic resin molding materials, pulp, organic fiber, small pieces of cloth, thermoplastic resin powders and the like. When an ordinary organic filler such as wood flour or the like is used, the resulting phenolic resin molding material is insufficient in mechanical strength and electrical properties (particularly, properties after boiling); and these properties can be improved to some extent by adding thermoplastic resin powders, cured thermosetting resin powders or an inorganic filler. Addition of thermoplastic resin powders, however, generally leads to reduction in heat resistance and there is a limit in the amount of said thermoplastic resin powders added. The use of cured thermosetting resin powders or a combination of the powders with wood flour was also attempted to obtain improvements in molding shrinkage and electrical properties (e.g. Japanese Patent Application Kokai (Laid-Open) Nos. 57-78444 and 59-105049); however, use of a large amount of cured thermosetting resin powders makes the resulting molded article hard and fragile and brings about no noticeable improvements in other properties.

As an inorganic filler, there are used powders of calcium carbonate, clay, silica, alumina, aluminum hydroxide, glass or the like; glass fiber; and so forth. As the inorganic filler, there are two types, i.e. a hard type such as silica, alumina, glass or the like, and a relatively soft type such as calcium carbonate, clay or the like, and they are selectively used depending upon applications of and requirements for the phenolic resin molding material in which said fillers are used. The inorganic filler exhibits excellent properties generally in mechanical strength, electrical properties, etc. The inorganic filler, as compared with the organic filler, is hard and has, in drilling operation or sliding of the phenolic resin molded article obtained, a problem of abrading a material (e.g., a drill or metal) which comes in contact with the molded article.

The present inventor made an extensive study in order to eliminate the above-mentioned drawbacks of the phenolic resin molding materials using a novolac type phenolic resin. As a result, the present inventor succeeded in developing a molding material which has excellent thermal stability in injection molding, which is easy to fill into a molding die, which has rapid curability, and which is capable of giving a molded article of excellent mechanical strength and excellent abrasion property (i.e., low in abrasion of the molded article itself and gives substantially no abrasion to a material which comes in contact with the molded article).

The present invention resides in a phenolic resin molding material comprising a phenolic resin, an organic filler, an inorganic filler and a liquid substance having a boiling point of 80°–150° C., said phenolic resin comprising, as its main component, a novolac type phenolic resin wherein the ratio of the o-methylene bond to the p-methylene bond with respect to the phenol nucleus ranges from 1.0 to 2.5.

In the phenolic resin molding material of the present invention, the phenolic resin comprises, as the main component, a novolac type phenolic resin wherein the ratio of the o-methylene bond to the p-methylene bond with respect to the phenol nucleus ranges from 1.0 to 2.5. This novolac type phenolic resin imparts rapid curability to the molding material. When the ratio of the o-methylene bond to the p-methylene bond is smaller than 1.0, sufficiently rapid curing cannot be achieved; a novolac type phenolic resin wherein the ratio is larger than 2.5 is difficult to synthesize. A preferable range of the ratio is 1.0–1.8, and a novolac type phenolic resin having such a ratio of o-methylene bond to p-methylene bond not only imparts rapid curability to the resulting molding material but also allows the molded article obtained from the molding material to have improved mechanical and electrical properties.

Such a novolac type phenolic resin preferably has a number-average molecular weight of 600–900. When the molecular weight is smaller than 600, the resin has a low melting point, is less convenient to handle, and has lower curability. When the molecular weight is larger than 900, the resin is less stable during production.

The so-called high-ortho-novolac type phenolic resin as mentioned above can be produced by a known process.

The phenolic resin can comprise, besides the above-mentioned high-ortho-novolac type phenolic resin, an ordinary novolac type phenolic resin (the so-called random novolac type phenolic resin) wherein the ratio of o-methylene to p-methylene bond is less than 1.0 and/or a resole type phenolic resin (methylol type, or dimethylene ether type). The proportion of the ordinary novolac type phenolic resin and/or the resole type phenolic resin varies depending upon requirements for the molding material to be obtained, but is generally 50% by weight or less, preferably 10–40% by weight based on the total phenolic resins. Use of such a resin composition makes possible improvements in mechanical strength and electrical properties and can achieve a lower cost.

The phenolic resin molding material of the present invention comprises a liquid substance having a boiling point of 80°–150° C. so that said material can have improved thermal stability in an injection cylinder, be easily filled into a molding die, and be capable of giving a molded article of stable and improved properties.

As such a liquid substance, there are cited various liquid substances such as methyl ethyl ketone, methyl isobutyl ketone, toluene, xylene, water, propanol, ethylene glycol and the like. Of these, particularly preferable are methyl ethyl ketone, toluene, water and propanol.

Use of the above liquid substance prevents the resulting molten molding material in an injection cylinder from overheating, by evaporation of the liquid substance, and furthermore allows the molding material to have higher flowability and lower melt torque. As a result, the molding material has improved thermal stability in an injection cylinder and can be easily filled into a molding die.

The amount of the liquid substance used is advantageously 0.5–4% by weight based on the whole molding material. When the amount is less than 0.5% by weight, the above-mentioned effect is not obtained to a lesser degree; when the amount is more than 4% by weight, there is obtained no higher effect due to the amount exceeding 4% by weight and the molded material obtained has a larger shrinkage ratio. The amount of the liquid substance used is preferably 0.5–2.5% by weight.

Then, description is made on the filler.

One of the features of the present invention is to use an organic filler and an inorganic filler in combination part of the organic filler preferably comprising a powder derived from one or more cured thermosetting resins. The cured thermosetting resin powders include not only powders of a cured thermosetting resin but also powders obtained by grinding a cured thermosetting resin molding material or a thermosetting resin laminate e.g. a thermostat decorative laminate. The cured thermosetting resin includes phenolic resin, melamine resin, epoxy resin, urethane resin, unsaturated polyester resin, etc.; and phenolic resin, melamine resin and epoxy resin are used generally.

Use of only an ordinary organic filler such as wood flour or the like gives a molded article which is less hard, less dimensionally accurate and less satisfactory in strength and abrasion. These drawbacks can be significantly alleviated by using, as a part of the organic filler, cured thermosetting resin powders. The cured thermosetting resin powders are hard as compared with other organic fillers but soft as compared with metals such as iron, aluminum or the like; therefore, said powders do not make the resultant molding abrasive against a material (tool such as a drill, or a metal) which comes in contact with the powders in drilling operation or sliding of the molded article produced from the present molding material comprising the powder.

The proportion of the cured thermosetting resin powders used in the organic filler is preferably 10–40% by weight. When the proportion is less than 10% by weight, the effect of using said powders is low; when the proportion is more than 40% by weight, the molded article obtained is hard and fragile, which is not preferable.

As the organic filler, there may be used, besides the cured thermosetting resin powders, wood flour, pulp, organic fiber, small pieces of cloth, thermoplastic resin powders, etc. depending upon applications of the resulting molding material.

An inorganic filler is used in combination with the above-mentioned organic filler. Use of an inorganic filler in combination can give improvements in strength, dimensional accuracy, electrical properties, etc. As the inorganic filler, there can be used calcium carbonate, talc, clay, silica, alumina, aluminum hydroxide, magnesium hydroxide, glass, etc. Depending upon the kind and amount of the inorganic filler used, the molded article obtained is hard and gives abrasion against a material (a drill or metal) which comes in contact with the molded article during drilling operation or sliding of the molded article. Hence, in the present invention, calcium carbonate, talc, clay, aluminum hydroxide or magnesium hydroxide, all of which are soft, is preferred as the inorganic filler and is used preferably in an amount of 20–40% by weight based on the total fillers, in view of abrasion requirement for the molded article obtained.

The phenolic resin molding material of the present invention is generally obtained by melt-kneading a blend of resin(s), fillers, additives, etc. using rolls, a co-kneader, an extruder or the like, followed by pelletization or cooling and grinding.

The resulting phenolic resin molding material is molded by an ordinary method such as injection molding or the like.

The phenolic resin molding material of the present invention exhibits rapid curability in molding because it comprises a high-ortho-novolac type phenolic resin as the main component of the phenolic resin, and has improved thermal stability in an injection cylinder and is easily filled into a molding die, e.g. injected because it comprises a liquid substance having a boiling point of 80°–150° C. Thereby, in injection molding, the present phenolic resin molding material has a shorter molding cycle and enables continuous molding, and the molded article obtained therefrom has stable and improved properties.

Further, since the present phenolic resin molding material uses an organic filler and an inorganic filler in combination and uses, as a part of the organic filler, cured thermosetting resin powders, the molded article obtained therefrom is improved in mechanical strength and abrasion property. When calcium carbonate, talc, clay, aluminum hydroxide or magnesium hydroxide, all of which are soft, is used as the inorganic filler, the molded material obtained is further improved in abrasion property.

The present invention is hereinafter described in more detail by way of Examples and Comparative Examples.

EXAMPLES 1–4 AND COMPARATIVE EXAMPLES 1–3

Phenolic resin molding materials were obtained by kneading the components shown in Table 1, in accordance with the compounding recipes shown in Table 1, using hot rolls. In Table 1, the numerical figures are by parts by weight.

In Comparative Example 1, a random novolac was used as the phenolic resin; a wood flour was used as the filler; and further toluene was used. In Comparative Example 2, the same random novolac was used as the phenolic resin; and the same wood flour and calcium carbonate were used as the filler. In Examples 1–4 and in Comparative Examples 1 and 2, magnesium oxide as a curing accelerator. In Comparative Example 3, a high-ortho-novolac was used as the main component of the phenolic resin; the same wood flour and calcium carbonate were used as the filler; and magnesium oxide was used as usual. No liquid substance having a boiling point of 80°–150° C. was used in either of Comparative Examples 2 and 3.

The molding materials obtained in each Example and each Comparative Example were measured for curability (minimum curing time in which no blister appeared), thermal stability (thermal stability in an injection cylinder), moldability (easiness of filling into a molding die), abrasion resistance (drill abrasion index) and bending strength. The results obtained are shown in Table 2.

creased by more than 0.05 mm, was taken as curing time in which blister appeared.

(2) Thermal stability in an injection cylinder:

Molded articles for test purpose each of 170 g were produced by injection molding with the in-cylinder temperature set at 85° C. In this case, the time in which the molding material stayed in the cylinder from the metering to the injection, was taken as staying time in the cylinder. This in-cylinder staying time was prolonged, for example, from 30 seconds to 60 seconds, 90

TABLE 1

| Components | Compounding for molding materials | | | | | | |
|---|---|---|---|---|---|---|---|
| | Example | | | | Comparative Example | | |
| | 1 | 2 | 3 | 4 | 1 | 2 | 3 |
| High-ortho-novolac type phenolic resin | 30 | 30 | 35 | 30 | 0 | 0 | 30 |
| Random novolac type phenolic resin | 12 | 12 | 7 | 12 | 42 | 42 | 12 |
| Hexamine | 8 | 8 | 8 | 8 | 8 | 8 | 8 |
| Wood flour | 28 | 28 | 28 | 28 | 42 | 28 | 28 |
| Cured thermosetting resin powders | 6 | 6 | 6 | 6 | 0 | 0 | 0 |
| Calcium carbonate | 8 | 8 | 8 | 8 | 0 | 14 | 12 |
| Magnesium oxide | 0 | 0 | 0 | 0 | 0 | 0 | 2 |
| Liquid substance | 2 (Toluene) | 2 (Propanol) | 2 (Toluene) | 2 (Water) | 2 (Toluene) | 0 | 0 |
| Releasing agent (stearic acid) | 1.5 | 1.5 | 1.5 | 1.5 | 1.5 | 1.5 | 1.5 |
| Coloring agent (black dye) | 1.5 | 1.5 | 1.5 | 1.5 | 1.5 | 1.5 | 1.5 |
| Curing assistant (calcium hydroxide) | 3 | 3 | 3 | 3 | 3 | 3 | 3 |

Notes
High-ortho-novolac type phenolic resin
Ratio of o-methylene bond to p-methylene bond = 1.2
Number-average molecular weight = 800
Random novolac type phenolic resin
Ratio of o-methylene bond to p-methylene bond = 0.8
Number-average molecular weight = 850
Cured thermosetting resin powders
Examples 1, 3 and 4: powders of a melamine resin decorative laminate
Example 2: Powders of cured product of a wood flour-containing phenolic resin molding material

TABLE 2

| Properties | Test Results | | | | | | |
|---|---|---|---|---|---|---|---|
| | Example | | | | Comparative Example | | |
| | 1 | 2 | 3 | 4 | 1 | 2 | 3 |
| Minimum curing time in which no blister appeared (seconds) | 10 | 8 | 8 | 10 | 15 | 15 | 10 |
| Thermal stability in an injection cylinder (minutes) | 300 | 300 | 300 | 300 | 300 | 240 | 220 |
| Moldability (easiness of filling) | ○ | ○ | ○ | ○ | Δ | x | Δ |
| Drill abrasion index | 1.5 | 1.5 | 1.5 | 1.5 | 1.5 | 1.5 | 2.0 |
| Bending strength (N/mm$^2$) | 95.2 | 98.9 | 96.1 | 96.7 | 73.2 | 84.2 | 93.4 |

Notes
Rating of moldability (easiness of filling)
○: good
Δ: unfilled portion remains slightly
x: unfilled portion remains Incidentally, impact strength and insulation resistance were measured, but there was no difference in these properties among the test samples.

Measurement methods (1) Minimum curing time in which no blister appeared

Test samples [60 mmΦ×4 mm (thickness)] were molded by injection molding with the die temperature set at 180° C. The curing time was shortened by one second each from 20 seconds. The curing time one second before the curing time in which blister appeared, was taken as minimum curing time in which no blister appeared. The time in which the thickness of a test sample (molding) as measured using a micrometer inseconds, . . . ; and the longest in-cylinder staying time which made injection possible, was taken as in cylinder thermal stability.

(3) Moldability (easiness of filling)

Injection molding (injection pressure=1,250 kgf/cm$^2$) was conducted from the die length (100 mm) direction with the test die (100 mm×5 mm×2 mm) temperature set at 180° C., and moldability (easiness of filling) was rated.

(4) Bending strength, Charpy impact strength and insulation resistance:

Were measured in accordance with JIS K 6911.

(5) Drill abrasion index

A hole was made in a 2 mm-thick aluminum plate using a drill, at 500 rpm (rotation of the drill edge) and at 1 mm/min (descending speed of the drill edge), and shape (A) of stress wave of the drill edge was measured. Then, using this drill and under the same conditions, 10 holes were made at 10 positions in each of 3 mm-thick test samples prepared from the molding materials of each Example and each Comparative Example; thereafter, a hole was made again in the 2 mm-thick aluminum plate, and shape (B) of stress wave of the drill edge was measured. Drill abrasion index was taken as a ratio of (A) to (B), i.e. (A)/(B).

The molding materials obtained in Examples 1–4 had excellent rapid curability, good thermal stability and good moldability, and gave molded articles of high bending strength and excellent abrasion property. The molding materials obtained in Comparative Examples 1 and 2 contained only a random novolac as the phenolic resin, and therefore were slow in curing, and gave molded articles inferior in bending strength. The molding material obtained in Comparative Example 3 used a high-ortho-novolac and hence had relatively rapid curability, but was inferior in thermal stability and moldability; and the molded article produced therefrom had a good bending strength owing to the use of magnesium oxide but showed poor abrasion property.

As clear from the above Examples, the phenolic resin molding material of the present invention has excellent rapid curability, is superior in thermal stability in an injection cylinder, and is easy to fill into a molding die; hence, the molding material can be molded in a shorter cycle and enables even continuous molding.

Further, the present phenolic resin molding material can provide a molded article of good mechanical strength and yet of excellent abrasion property. Therefore, the molded article enables good drilling operation and are superior also in abrasion during sliding and die abrasion during molding. Further, the molded article is at least equal to those produced from conventional molding materials, in electrical properties and dimensional accuracy.

I claim:

1. A phenolic resin molding material comprising a phenolic resin, an organic filler, an inorganic filler and a liquid substance having a boiling point of 80°–150° C. said phenolic resin comprising, as its main component, a novolac type phenolic resin wherein the ratio of the o-methylene bond to the p-methylene bond with respect to the phenol nucleus ranges from 1.0 to 2.5.

2. A phenolic resin molding material according to claim 1, wherein the organic filler comprises 10–40% by weight of cured powders of a thermosetting resin.

3. A phenolic resin molding material according to claim 2, wherein the thermosetting resin is selected from the group consisting of phenolic resin, melamine resin, epoxy resin, urethane resin and unsaturated polyester resin.

4. A phenolic resin molding material according to claim 2, wherein the organic filler other than the cured powders of the thermosetting resin is selected from the group consisting of wood flour, pulp, organic fiber, small pieces of cloth and thermoplastic resin powders.

5. A phenolic resin molding material according to claim 2, wherein the inorganic filler is selected from the group consisting of calcium carbonate, talc, clay, silica, alumina, aluminum hydroxide, magnesium hydroxide and glass.

6. A phenolic resin molding material according to claim 5, wherein the inorganic filler is calcium carbonate, talc, clay, aluminum hydroxide or magnesium hydroxide.

7. A phenolic resin molding material according to claim 6, wherein the proportions of the organic filler and the inorganic filler are 60–80% by weight and 40–20% by weight, respectively.

8. A phenolic resin molding material according to claim 1, wherein the liquid substance is selected from the group consisting of methyl ethyl ketone, methyl isobutyl ketone, toluene, xylene, water, propanol and ethylene glycol, and is incorporated in an amount of 0.5–4% by weight based on the whole molding material.

9. A phenolic resin molding material according to claim 1, wherein the phenolic resin consists of (a) a novolac phenolic resin wherein the ratio of the o-methylene bond to the p-methylene bond with respect to the phenol nucleus ranges from 1.0 to 2.5 and (b) a novolac phenolic resin wherein the ratio of the o-methylene bond to the p-methylene bond is less than 1.0.

10. A phenolic resin molding material according to claim 9, wherein the novolac phenolic resin (b) having a ratio of the o-methylene bond to the p-methylene bond less than 1.0, is incorporated in an amount of 10–40% by weight based on the total phenolic resins.

11. A phenolic resin molding material according to claim 9, wherein the organic filler comprises 10–40% by weight of cured powders of a thermosetting resin.

12. A phenolic resin molding material according to claim 11, wherein the thermosetting resin is selected from the group consisting of phenolic resin, melamine resin, epoxy resin, urethane resin and unsaturated polyester resin.

13. A phenolic resin molding material according to claim 11, wherein the organic filler other than the cured powders of the thermosetting resin is selected from the group consisting of wood flour, pulp, organic fiber, small pieces of cloth and thermoplastic resin powders.

14. A phenolic resin molding material according to claim 11, wherein the inorganic filler is selected from the group consisting of calcium carbonate, talc, clay, silica, alumina, aluminum hydroxide, magnesium hydroxide and glass.

15. A phenolic resin molding material according to claim 14, wherein the inorganic filler is calcium carbonate, talc, clay, aluminum hydroxide or magnesium hydroxide.

16. A phenolic resin molding material according to claim 15, wherein the proportions of the organic filler and the inorganic filler are 60–80% by weight and 40–20% by weight, respectively.

17. A phenolic resin molding material according to claim 9, wherein the liquid substance is selected from the group consisting of methyl ethyl ketone, methyl isobutyl ketone, toluene, xylene, water, propanol and ethylene glycol, and is incorporated in an amount of 0.5–4% by weight based on the whole molding material.

18. A phenolic resin molding material according to claim 1, wherein said novolac phenolic resin has a number-average molecular weight of 600–900.

19. A phenolic resin molding material according to claim 8, wherein the amount of the liquid substance is 0.5–2.5% by weight.

20. In a kneadable phenolic resin molding material comprising a phenolic resin and a particulate filler, the improvement comprising said phenolic resin comprising, as its main component, a novolac phenolic resin wherein the ratio of the o-methylene bond to the p-methylene bond with respect to the phenol nucleus ranges from 1.0 to 2.5 and having a number average molecular weight of 600-900, said phenolic resin further comprising 10-40% by weight based on the total phenolic resin of a novolac phenolic resin having a ratio of o-methylene bond to p-methylene bond less than 1.0;

said filler comprising a mixture of 60-80% by weight organic filler and 40-20% by weight inorganic filler, said organic filler comprising 10-40% by weight of cured powders of at least one thermosetting resin, and said inorganic filler being selected from the group consisting of calcium carbonate, talc, clay, silica, alumina, aluminum hydroxide, magnesium hydroxide and glass; and said composition further comprising 0.5-4% by weight based on said molding material of a liquid having a boiling point of 80°-150° C.

* * * * *

UNITED STATES PATENT AND TRADEMARK OFFICE
CERTIFICATE OF CORRECTION

PATENT NO.     : 5,432,227                                            Page 1 of 1
DATED          : July 11, 1995
INVENTOR(S)    : Norihisa Fujimura It is certified that error appears in the above-identified patent and that said Letters Patent is hereby corrected as shown below:

<u>Column 7,</u>
Line 45, delete "type".

Signed and Sealed this

Eleventh Day of November, 2003

JAMES E. ROGAN
*Director of the United States Patent and Trademark Office*